Figure 1:
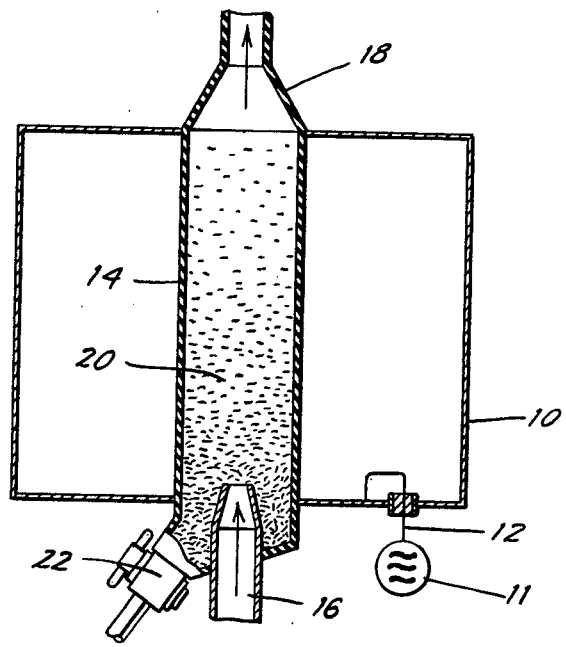

Feb. 23, 1965   W. SCHELLER ETAL   3,171,009
HEAT TREATMENT OF HIGH-MELTING SOLIDS
IN FINE PARTICLE FORM
Filed April 24, 1961

INVENTORS
Walter Scheller
and Hans Paul
BY Nenderoth, Lind & Ponack
ATTORNEYS

3,171,009
HEAT TREATMENT OF HIGH-MELTING SOLIDS IN FINE PARTICLE FORM

Walter Scheller, Muenchenstein, and Hans Paul, Wettingen, Switzerland, assignors to Ciba Limited, Basel, Switzerland, a company of the Swiss Confederation
Filed Apr. 24, 1961, Ser. No. 104,906
Claims priority, application Switzerland, Apr. 29, 1960, 4,960/60
4 Claims. (Cl. 219—10.55)

The present invention relates to the heat treatment of high-melting solids, particularly metals, in fine particle form.

It is well known that the heat treatment of high-melting solids, in particular metals for example tantalum, niobium, tungsten, molybdenum, vanadium, rhenium presents difficulties in the choice of material for the container or vessel used in the heat treatment. It has been difficult in the past to find a material sufficiently resistant to the high temperatures employed and which is such that no migration of container material into the material to be treated occurs, thereby reducing the purity of the latter.

Heat treatment of solid particles may serve a variety of purposes, for example to increase grain size by letting the smallest particles coalesce or agglomerate and thus to obtain a coarse-grained material. This coalescence of particles may take place along with a reduction or dissociation process during which pure metal formed in the process deposits or grows on existing particles.

The present invention relates to a method of heat treating high-melting solid particles, particularly metals in fine distribution, which is characterized in that a fluidized bed of the solid particles is produced and in that the fluidized bed is subjected to an HF-field.

The term "metal" should here be undertsood in its widest sense, since particles of material can be treated which become conductive only at high temperatures, for example semi-conductor material. Those particles must be pre-heated to a suitable temperature before a heat treatment process embodying the invention is carried out so that they attain the necessary conductivity. The heat treatment may also be applied to substances which become conductive at the temperatures occurring in the fluidized bed even though the substances are not metals in the strict sense.

In a further embodiment of the invention, metal particles within the fluidized bed are heated by the HF-field to a temperature above the recrystallization temperature of the metal, in order thus to produce by growing large-size metal particles from smaller-size metal particles. If the heat treatment is employed to produce metal by a reduction or dissociation process so as to let this metal grow on metal particles already present in the fluidized bed, then, according to a further subsidiary feature of the invention, it is possible to introduce into the fluidized bed hydrogen and a chloride of the metal concerned which is reduced by the hydrogen or dissociated at the temperature prevailing in the turbulence layer. It is then possible to adjust the particle temperature prevailing in the fluidized bed so that the pure metal newly formed by the reaction associates itself with particles in the fluidized bed.

Speaking generally, a heat treatment embodying the invention and the apparatus for carrying out the method may be employed for effecting a desired chemical reaction between substances in the gaseous phase and heated solid particles, that is, for example, for producing carbides, sulfides, nitrides, phosphides, arsenides, borides, selenides, tellurides, cyanides, etc. from a metal and the corresponding compound, such as $H_2S$, $AsH_3$, $PH_3$, $BH_3$, for dehydrogenation in a high vacuum or with a protective gas, and for reduction to lower valencies, such as the reduction of tantalum penta-chloride with tantalum, to form the tri-chloride.

The reduction of the volatile chlorides with hydrogen may be effected by the method described above for all volatile metallic chlorides in which the average energy of a metal-chlorine compound at a temperature of 800° C. is below the value of 24 kg. cal. The process is suitable therefore, particularly for the reduction of niobium and tantalum pentachloride, pentavalent and hexavalent tungsten chloride, molybdenum chloride, vanadium chloride and trivalent and tetravalent rhenium chloride.

For heating the fluidized bed, microwaves are used, i.e., waves of a frequency of more than 1000 megacycles per second. By means of these microwaves, an HF-field in an enclosed space is generated inside which the fluidized bed of particles is located. For producing the field a cavity guide may be employed in which a travelling field is set up, or a cavity resonator excited by the microwaves in which a standing wave with a predetermined mode is generated. Depending upon the wave mode, the maxima of the associated magnetic field and of the electric field occur in specified regions of the resonator. For a more detailed discussion of the theory of cavity resonators, see "Natural Oscillations of Electrical Cavity Resonators," by W. L. Barrow et al., Proceedings of the I.R.E., April 1940, p. 134.

Since the magnetic field governs the heating of the fluidized bed regions located within the field, the fluidized bed is preferably limited to those regions of the HF-field within the cavity resonator in which the effective magnetic component is large. If the cavity resonator is excited, for example, in the so-called $E_{011}$-mode (see "Electrical Engineers' Handbook," by Pender and McIlwan, 1949–50, pp. 7–95 to 7–106), then the magnetic field component along the axis of the cylindrical cavity resonator is of maximum value, and decreases towards the outer resonator surfaces, traverses zero at a radius of approximately 2/3 of the total radius of the cavity resonator and rises again in the viciniay of the outer surface of the resonator to about 0.4 of the maximum value. If it is intended to limit the fluidized bed, in a way already mentioned, to the regions having a large effective magnetic component, it is useful to locate the bed in a central zone of the resonator adjacent the axis of the resonator. The limitation in space of the fluidized bed may be effected either by suitable guidance and formation of the gas stream which sets up the fluidized bed or by using partitions of an electrically insulating material. Thus it is possible, for example, so to position the input gas stream orifices that the creation of the bed by the gas stream is limited to a central zone of the cavity resonator.

In another embodiment of the invention there is a tube of electrically insulating material, made for example of aluminum oxide inserted centrally in the resonator. The fluidized bed is located within the inserted tube which forms a partition, so that the cavity resonator portion outside the tube remains free of the fluidized particles. The electrically insulating material of the tubular partition has little influence on the distribution of the electric and magnetic fields within the cavity resonator so that the desired wave mode can be set up almost without being influenced by the inserted tubular partition.

Where a tubular partition is employed, the fluidized bed is preferably distributed in space by directing and dimensioning that gas stream in such a way that the density of the fluidized bed is small in those regions in which the magnetic component is large according to the selected wave mode of the resonator. This is done to reduce as far as possible the reaction of the particles on the magnetic component, since the heating effect which can be imparted to the individual particles depends upon the magnitude of this component. On the one hand, this heating effect is proportional to the square of the magnetic component prevailing in a certain field region, but it also depends upon the density (bulk density) of the fluidized bed at that region. It follows that the heating effect which can be imparted to any one particle depends, on the one hand, on the time during which this particle remains in the HF-field and, on the other hand, upon the density of the fluidized bed, the duration of passage required for the generation of a certain temperature being the longer the greater the density of the fluidized bed. Therefore the fluidized bed is preferably designed in such manner that the time of passage of individual particles through the fluidized bed required for heating to a certain temperature is reduced to a minimum. The attainable heating effect is also dependent upon the average radius of the particles forming the fluidized bed. Advantageously, the average particle radius is substantially equal to 1 to 5 times the penetration depth of eddy currents generated in the particles by the HF-field.

The process described above succeeds in confining those metal particles which have been heated to a high temperature to the inner region of the particle container. The reason is that the maximum heating effect produced by the HF-field is generated approximately in the central zone of the cavity resonator, as has already been mentioned. Since the magnetic field strength drops in the marginal regions of the cavity resonator, the temperature in the fluidized bed decreases considerably towards the outer regions of the cavity resonator. It follows that the temperature of particles situated within the fluidized bed is considerably higher than that of particles in contact with the walls. Thermal stresses set up in the walls are thus considerably reduced, due to the reduced temperature of the walls.

The reaction heat needed for carrying out an intended process is confined to the interior of the reaction vessel and is kept remote from its walls. It thus becomes possible, by cooling, to maintain those walls at temperatures which do not allow of detrimental corrosion or of impairment of the mechanical properties of the walls. Yet the heat losses are not inadmissibly high and it is possible to maintain the temperatures within the fluidized bed above the recrystallization point of the metals being processed so that coalescence of, or growing on, metal particles can take place. This growing process may be employed, as has been mentioned already, either to obtain coarse-grained materials by the coalescence of finely grained material or, for example, by a reduction of metal chlorides with hydrogen taking place simultaneously in the fluidized bed, to let reduced metal grow directly on the larger metal particles present in the fluidized bed. It thus becomes possible to obtain, by a single operational step, particles of a grain size best suited for further metallurgic processing. Furthermore, the process may be carried out continuously by using the gas stream to feed in continuously new material or new basic substances to be reduced while the larger metal particles produced in the process by growth are drawn off continuously.

The invention also relates to apparatus for carrying out the method and two embodiments of the apparatus are shown in the accompanying drawings. FIG. 1 shows in diagrammatic form a resonator with a tubular partition and FIG. 2 a resonator without a tubular partition.

Advantageously, a cylindrical cavity resonator is employed which is excited in the $E_{011}$-mode by an HF-oscillator. In the embodiment shown in FIG. 1 a cylindrical cavity resonator with a coaxial tubular partition of electrically insulating material within the resonator is used, the latter forming the actual reaction vessel within which the fluidized bed is produced, the partition being preferably located in a region where the magnetic component of the HF-field is nil. As indicated already above, the magnetic field strength in the case of a cavity resonator excited in the $E_{011}$-mode has a maximum adjacent the axis of the cylindrical cavity resonator, then drops to zero and then rises again towards the outer surface to a value of approximately 0.4 of the maximum value. The electrically insulating partition may be arranged in that cylindrical plane in which the magnetic component is nil.

FIG. 1 shows a cylindrical cavity resonator 10 in section along the cylinder axis. A coupling loop 12 serves to introduce electric energy supplied by an oscillator 11 to maintain the HF-field. In the resonator 10 is inserted a partition consisting of a tube 14 of an electrically insulating material, for example aluminum oxide. If the resonator is excited in the $E_{011}$-mode and the partition is to be located in a region where the magnetic field strength is nil, then the diameter of this tube will be approximately $\frac{2}{3}$ of the diameter of the resonator. At the bottom of the tube there is a nozzle 16 for the introduction of a gas stream which maintains a fluidized bed in particles within the tube. The gas stream leaves at the upper end 18 of the tube and whirls up particles 20 inside the tube. Through a slide 22 completely processed particles can be drawn off.

Thus in the tubular partition, a fluidized bed of metal particles is produced.

As has already been mentioned, the insulating partition can be cooled externally to a temperature which allows improvement of the mechanical properties and the corrosion characteristic of the partition. To this purpose, the space between the outer wall of the cavity resonator and the partition can be charged with a coolant, for example cooling air or an inert gas. The heat produced by this cooling operation may advantageously be exploited by using the gaseous coolant, which is heated when passing through the cooling space, for producing the fluidized bed. In this way it becomes possible to produce a considerably higher temperature within the fluidized bed.

Figure 2:
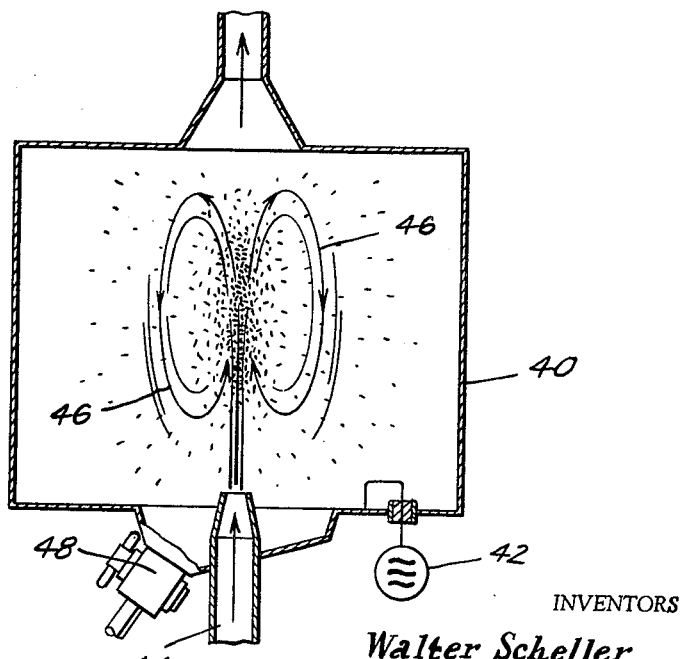

FIG. 2 shows another embodiment of the invention employing a resonator without a partition. Inside the resonator 40 an HF-field is generated again by means of an oscillator 42. The fluidized bed of metal particles, represented by the flow-indicating arrows 46, is maintained by gas entering through nozzle 44. Completely processed particles are drawn off through a slide 48. By suitably shaping and locating the orifice 44, the fluidized bed is confined to a central cylindrical zone of the cavity resonator.

The facility, provided by the method described above, of converting finely grained metals into more coarsely grained ones is of great importance. Usually, known processes for manufacturing high-melting metals produce the metal in a very finely grained form, with grain sizes in the order of magnitude of several microns. The further employment and processing of such very fine powders presents great difficulties because, on the one hand, the metals, owing to their very large surface resulting from the fineness of the grain, tend to absorb gases easily and are in many cases pyrophoric. A method embodying the present invention allows coalescence of finely grained powders into more coarsely grained powders, and this considerably improves the processing capacity and the quality of the material.

The invention is of course not confined to the processes and apparatus indicated here by way of example. As has already been mentioned, instead of a cavity resonator a cavity wave guide can be used in which case a travelling HF-wave is set up instead of a standing wave. Furthermore, in the reduction and dissociation processes not only the chlorides mentioned by way of example, but also other metal compounds may be employed.

It is also possible so to build the reaction vessel that it consists of a plurality of consecutive cavity resonators, thereby providing a plurality of zones of maximum magnetic field strength in separate spaces.

Also, it is possible, by suitable dimensioning of the density of the fluidized bed, to achieve additional welding of the particles by electric flash-overs between particles. This occurs in those field regions of the fluidized beds in which the magnetic field strength is such as to induce eddy currents of a value exceeding approximately 400 A./cm.

Finally, the generation of the HF-field may take place in an intermittent or pulsed manner instead of continuously.

What is claimed is:

1. An apparatus for heating and causing to grow, fine-grained solid particles of a metal selected from the group consisting of tantalum, niobium, tungsten, molybdenum, vanadium and rhenium, said apparatus being adapted to suspending said particles in a fluidizing gas stream and heating said particles to a temperature in the zone of the recrystallization temperature of said metal, said apparatus comprising a cylindrical, vertically arranged cavity resonator connected by inductive coupling means to, and in resonance with, a source of high-frequency electromagnetic waves the frequency of said waves being higher than 1000 megacycles per second and said coupling means being adapted to excite in said cavity a standing wave with the $E_{011}$-mode, whereby the effective magnetic component of said standing wave has its maximum amount in the axis of said cavity and wherein the average particle size and the frequency of said waves are in such relation that the average particle radium is substantially equal to 1 to 5 times the penetration depth of eddy currents generated in said particles by the magnetic field of said standing wave, said apparatus further comprising a gas inlet nozzle located centrally in the bottom end of said cavity resonator for introducing a substantially axial gas stream, a gas outlet opening in the upper end of said cavity, means for confining the diameter of said gas stream to less than two thirds of the diameter of said cavity, and means for collecting the grown particles at the bottom end of said cavity.

2. An apparatus for heating and causing to grow fine-grained solid particles of a metal selected from the group consisting of tantalum, niobium, tungsten, molybdenum, vanadium and rhenium, said apparatus being adapted to suspending said particles in a fluidizing gas stream and heating said particles to a temperature in the zone of the recrystallization temperature of said metal, said apparatus comprising a cylindrical, vertically arranged cavity resonator connected by inductive coupling means to, and in resonance with, a source of high-frequency electromagnetic waves the frequency of said waves being higher than 1000 megacycles per second and said coupling means being adapted to excite in said cavity a standing wave with the $E_{011}$-mode, whereby the effective magnetic component of said standing wave has its maximum amount in the axis of said cavity and wherein the average particle size and the frequency of said waves are in such relation that the average particle radium is substantially equal to 1 to 5 times the penetration depth of eddy currents generated in said particles by the magnetic field of said standing wave, said apparatus further comprising a gas inlet nozzle located centrally in the bottom end of said cavity resonator for introducing a substantially axial gas stream, a gas outlet opening in the upper end of said cavity, an axial tube of electrically insulating, heat resistant material connecting said gas inlet nozzle and said gas outlet opening, said tube having a mean diameter approximately equal to two thirds of the diameter of said cavity, and said tube extending beyond the bottom end of said cavity and being closed by a slide.

3. An apparatus for heating and causing to grow fine-grained solid particles of a metal selected from the group consisting of tantalum, niobium, tungsten, molybdenum, vanadium and rhenium, said apparatus being adopted for suspending the said particles in a fluidizing gas stream and heating said particles to a temperature in the zone of the recrystallization temperature of said metal, said apparatus comprising a cylindrical, vertically arranged cavity resonator connected by inductive coupling means to, and in resonance with, a source of high-frequency electromagnetic waves the frequency of said waves being higher than 1000 megacycles per second and said coupling means being adapted to excite in said cavity a standing wave with the $E_{011}$-mode, whereby the effective magnetic component of said standing wave has its maximum amount in the axis of said cavity and wherein the average particle size and the frequency of said waves are in such relation that the average particle radius is substantially equal to 1 to 5 times the penetration depth of eddy currents generated in said particles by the magnetic field of said standing wave, said apparatus further comprising a gas inlet nozzle located centrally in the bottom end of said cavity for introducing a substantially axial gas stream, a gas outlet opening in the upper end of said cavity, said gas stream being composed of hydrogen and a chloride of said metal, means for confining the diameter of said gas stream to less than two thirds of the diameter of said cavity, and means for collecting the grown particles at the bottom end of said cavity.

4. An apparatus for heating and causing to grow fine-grained solid particles of a metal selected from the group consisting of tantalum, niobium, tungsten, molybdenum, vanadium and rhenium, said apparatus being adapted for suspending said particles in a fluidizing gas stream and heating said particles to a temperature in the zone of the recrystallization temperature of said metal, said apparatus comprising a cylindrical, vertically arranged cavity resonator connected by inductive coupling means to, and in resonance with, a source of high-frequency electromagnetic waves the frequency of said waves being higher than 1000 megacycles per second and said coupling means being adapted to excite in said cavity a standing wave with the $E_{011}$-mode, whereby the effective magnetic component of said standing wave has its maximum amount in the axis of said cavity and wherein the average particle size and the frequency of said waves are in such relation that the average particle radium is substantially equal to 1 to 5 times the penetration depth of eddy currents generated in said particles by the magnetic field of said standing wave, said apparatus further comprising a gas inlet nozzle located centrally in the bottom end of said cavity for introducing a substantially axial gas stream, a gas outlet opening in the upper end of said cavity, said gas stream being composed of hydrogen and a chloride of said metal, an axial tube of electrically insulating, heat resistant material connecting said gas inlet nozzle and said gas outlet opening, said tube having a mean diameter approximately equal to two thirds of the diameter of said cavity, and said tube extending beyond the bottom end of said cavity and being closed by a slide.

References Cited by the Examiner

UNITED STATES PATENTS

| 2,038,251 | 4/36 | Vogt | 75—.55 X |
| 2,393,363 | 1/46 | Gold et al. | 148—154 |
| 2,411,409 | 11/46 | Ballard. | |
| 2,585,970 | 2/52 | Shaw. | |
| 2,870,002 | 1/59 | Johnson | 75—9 |
| 3,020,148 | 2/62 | Jenkins et al. | 75—84.5 X |

DAVID L. RECK, *Primary Examiner.*

WINSTON A. DOUGLAS, *Examiner.*